United States Patent [19]

Plavac

[11] Patent Number: 5,752,991
[45] Date of Patent: May 19, 1998

[54] VERY LONG CHAIN ALKYLPHENYL POLYOXYALKYLENE AMINES AND FUEL COMPOSITIONS CONTAINING THE SAME

[75] Inventor: Frank Plavac, Mill Valley, Calif.

[73] Assignee: Chevron Chemical Company, San Ramon, Calif.

[21] Appl. No.: 581,657

[22] Filed: Dec. 29, 1995

[51] Int. Cl.$^6$ .................................... C10L 11/22
[52] U.S. Cl. .......................... 44/424; 425/433; 564/306
[58] Field of Search ........................ 44/425, 424, 433; 564/306

[56] References Cited

U.S. PATENT DOCUMENTS

| | | | |
|---|---|---|---|
| 3,440,029 | 4/1969 | Little et al. | 44/75 |
| 3,849,085 | 11/1974 | Kreuz et al. | 44/78 |
| 4,024,083 | 5/1977 | Kablaoui et al. | 44/424 |
| 4,191,537 | 3/1980 | Lewis et al. | 44/71 |
| 4,247,301 | 1/1981 | Honnen | 44/63 |
| 4,332,595 | 6/1982 | Herbstman et al. | 44/72 |
| 4,609,377 | 9/1986 | Sung et al. | 44/424 |
| 4,778,481 | 10/1988 | Courtney | 44/425 |
| 4,881,945 | 11/1989 | Buckley | 44/72 |
| 5,112,364 | 5/1992 | Rath et al. | 44/418 |

*Primary Examiner*—Margaret Medley
*Attorney, Agent, or Firm*—Claude J. Caroli

[57] ABSTRACT

Very long chain alkylphenyl polyoxyalkylene amines having the formula:

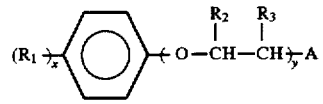

wherein $R_1$ is an alkyl group having at least 40 carbon atoms;

$R_2$ and $R_3$ are each independently hydrogen or lower alkyl having about 1 to about 2 carbon atoms and each $R_2$ and $R_3$ is independently selected in each —O—$CHR_2$—$CHR_3$— unit;

A is an amine moiety derived from ammonia, a primary alkyl monoamine having about 1 to 20 carbon atoms, a secondary dialkyl monoamine having about 1 to 20 carbon atoms in each alkyl group, or a polyamine having about 2 to about 12 amine nitrogen atoms and about 2 to about 40 carbon atoms;

x is an integer from about 1 to about 2; and y is an integer from about 5 to about 50.

The very long chain alkylphenyl polyoxyalkylene amines of the present invention are useful as fuel additives for the prevention and control of engine deposits.

54 Claims, No Drawings

VERY LONG CHAIN ALKYLPHENYL POLYOXYALKYLENE AMINES AND FUEL COMPOSITIONS CONTAINING THE SAME

BACKGROUND OF THE INVENTION

1. Field of the Invention

This invention relates to novel alkylphenyl polyoxyalkylene amines and to fuel compositions containing alkylphenyl polyoxyalkylene amines. More particularly, this invention relates to alkylphenyl polyoxyalkylene amines having an alkyl group containing at least 40 carbon atoms on the aromatic moiety and to the use of such compounds in fuel compositions to prevent and control engine deposits.

2. Description of the Related Art

It is well known that automobile engines tend to form deposits on the surface of engine components, such as carburetor ports, throttle bodies, fuel injectors, intake ports and intake valves, due to the oxidation and polymerization of hydrocarbon fuel. These deposits, even when present in relatively minor amounts, often cause noticeable driveability problems, such as stalling and poor acceleration. Moreover, engine deposits can significantly increase an automobile's fuel consumption and production of exhaust pollutants. Therefore, the development of effective fuel detergents or "deposit control" additives to prevent or control such deposits is of considerable importance and numerous such materials are known in the art.

For example, aliphatic hydrocarbon-substituted phenols are known to reduce engine deposits when used in fuel compositions. U.S. Pat. No. 3,849,085, issued Nov. 19, 1974 to Kreuz et al., discloses a motor fuel composition comprising a mixture of hydrocarbons in the gasoline boiling range containing about 0.01 to about 0.25 volume percent of a high molecular weight aliphatic hydrocarbon-substituted phenol in which the aliphatic hydrocarbon radical has an average molecular weight in the range of about 500 to about 3,500. This patent teaches that gasoline compositions containing minor amounts of an is aliphatic hydrocarbon-substituted phenol not only prevent or inhibit the formation of intake valve and port deposits in a gasoline engine, but also enhance the performance of the fuel composition in engines designed to operate at higher operating temperatures with a minimum of decomposition and deposit formation in the manifold of the engine.

Polyether amine fuel additives are also well known in the art for the prevention and control of engine deposits. These polyether additives have a polyoxyalkylene "backbone", i.e., the polyether portion of the molecule consists of repeating oxyalkylene units. U.S. Pat. No. 4,191,537, issued Mar. 4, 1980 to Lewis et al., for example, discloses a fuel composition comprising a major portion of hydrocarbons boiling in the gasoline range and from 30 to 2,000 ppm of a hydrocarbyl polyoxyalkylene aminocarbamate having a molecular weight from about 600 to 10,000, and at least one basic nitrogen atom. The hydrocarbyl polyoxyalkylene moiety is composed of oxyalkylene units having from 2 to 5 carbon atoms in each oxyalkylene unit. These fuel compositions are taught to maintain the cleanliness of intake systems without contributing to combustion chamber deposits.

Aromatic compounds containing a poly(oxyalkylene) moiety are also known in the art. For example, the above-mentioned U.S. Pat. No. 4,191,537, discloses alkylphenyl poly(oxyalkylene) polymers which are useful as intermediates in the preparation of alkylphenyl poly(oxyalkylene) aminocarbamates.

Similarly, U.S. Pat. No. 4,881,945, issued Nov. 21, 1989 to Buckley, discloses a fuel composition comprising a hydrocarbon boiling in the gasoline or diesel range and from about 30 to about 5,000 parts per million of a fuel soluble alkylphenyl polyoxyalkylene aminocarbamate having at least one basic nitrogen and an average molecular weight of about 800 to 6,000 and wherein the alkyl group contains at least 40 carbon atoms.

U.S. Pat. No. 5,112,364, issued May 12, 1992 to Rath et al., discloses gasoline-engine fuels which contain small amounts of a polyetheramine and/or a polyetheramine derivative, wherein the polyetheramine is prepared by reductive amination of a phenol-initiated or alkylphenol-initiated polyether alcohol with ammonia or a primary amine.

U.S. Pat. No. 4,332,595, issued Jun. 1, 1982 to Herbstman et al., discloses a gasoline detergent additive which is a hydrocarbyl-substituted polyoxypropylene diamine, wherein the hydrocarbyl substituent contains 8 to 18 carbon atoms. This patent further teaches that the additive is prepared by reductive amination of a hydrocarbyl-substituted polyoxypropylene alcohol with ammonia to give a polyoxypropylene amine, which is subsequently reacted with acrylonitrile to give the corresponding N-2-cyanoethyl derivative. Hydrogenation in the presence of ammonia then provides the desired hydrocarbyl-substituted polyoxypropylene N-3-aminopropyl amine.

U.S. Pat. No. 3,440,029, issued Apr. 22, 1969 to Little et al., discloses a gasoline anti-icing additive which is a hydrocarbyl-substituted polyoxyalkylene amine, wherein the hydrocarbyl substituent contains 8 to 24 carbon atoms. This patent teaches that the additive may be prepared by known processes wherein a hydroxy compound is condensed with an alkylene oxide or mixture of alkylene oxides and then the terminal amino group is attached by either reductive amination or by cyanoethylation followed by hydrogenation. Alternatively, the hydroxy compound or oxyalkylated derivative thereof may be reacted with bis(2-chloroethyl)ether and alkali to make a chlorine-terminated compound, which is then reacted with ammonia to produce the amine-terminated final product.

U.S. Pat. No. 4,247,301, issued Jan. 27, 1981 to Honnen, discloses hydrocarbyl-substituted poly(oxyalkylene) polyamines, wherein the hydrocarbyl group contains from 1 to 30 carbon atoms and the polyamine moiety contains from 2 to 12 amine nitrogen atoms and from 2 t 40 carbon atoms. This patent teaches that the additives may be prepared by the reaction of a suitable hydrocarbyl-terminated polyether alcohol with a halogenating agent such as HCl, thionyl chloride, or epichlorohydrin to form a polyether chloride, followed by reaction of the polyether chloride with a polyamine to form the desired poly(oxyalkylene) polyamine. This patent also teaches at Example 6 that the polyether chloride may be reacted with ammonia or dimethylamine to form the corresponding polyether amine or polyether dimethylamine.

It has now been discovered that certain very long chain alkylphenyl polyoxyalkylene amines provide excellent control of engine deposits, especially intake valve deposits, when employed as fuel additives in fuel compositions.

SUMMARY OF THE INVENTION

The present invention provides novel fuel-soluble very long chain alkylphenyl polyoxyalkylene amine fuel additives which are useful for the prevention and control of engine deposits, particularly intake valve deposits.

The fuel-soluble very long chain alkylphenyl polyoxyalkylene amines of the present invention have the formula:

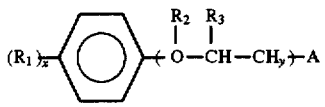

wherein $R_1$ is an alkyl group having at least 40 carbon atoms;

$R_2$ and $R_3$ are each independently hydrogen or lower alkyl having from about 1 to about 2 carbon atoms and each $R_2$ and $R_3$ is independently selected in each —O—CHR$_2$—CHR$_3$— unit;

A is an amine moiety derived from ammonia, a primary alkyl monoamine having about 1 to 20 carbon atoms, a secondary dialkyl monoamine having about 1 to 20 carbon atoms in each alkyl group, or a polyamine having about 2 to about 12 amine nitrogen atoms and about 2 to about 40 carbon atoms;

x is an integer from about 1 to about 2; and y is an integer from about 5 to about 50.

The present invention further provides a fuel composition comprising a major amount of hydrocarbons boiling in the gasoline or diesel range and an effective deposit-controlling amount of a very long chain alkylphenyl polyoxyalkylene amine of the present invention.

The present invention additionally provides a fuel concentrate comprising an inert stable oleophilic organic solvent boiling in the range of from about 150° F. to about 400° F. (about 65° C. to about 205° C.) and from about 10 to about 70 weight percent of a very long chain alkylphenyl polyoxyalkylene amine of the present invention.

Among other factors, the present invention is based on the surprising discovery that certain very long chain alkylphenyl polyoxyalkylene amines provide excellent control of engine deposits, especially on intake valves, when employed as fuel additives in fuel compositions.

DETAILED DESCRIPTION OF THE INVENTION

The very long chain alkylphenyl polyoxyalkylene amines of the present invention have the general formula:

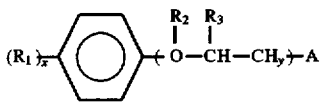

wherein $R_1$, $R_2$, $R_3$, A, x and y are as defined above.

In Formula I, above, $R_1$ is an alkyl group having at least 40 carbon atoms. Preferably, $R_1$ is an alkyl group having from about 50 to about 200 carbon atoms and more preferably from about 50 to about 100 carbon atoms. Most preferably, $R_1$ is an alkyl group having from about 60 to about 100 carbon atoms.

$R_2$ and $R_3$ are preferably hydrogen.

In general, A is derived from ammonia; a primary alkyl monoamine having from about 1 to about 20 carbon atoms, preferably about 1 to about 6 carbon atoms, more preferably about 1 to about 4 carbon atoms; a secondary dialkyl monoamine having from about 1 to about 20 carbon atoms in each alkyl group, preferably about 1 to about 6 carbon atoms, more preferably about 1 to about 4 carbon atoms; or a polyamine having from about 2 to about 12 amine nitrogen atoms and from about 2 to about 40 carbon atoms, preferably about 2 to 12 amine nitrogen atoms and about 2 to 24 carbon atoms. More preferably, A is derived from ammonia or a polyamine. Most preferably, A is an —NH$_2$ group derived from ammonia.

Preferably, x is about 1.

Preferably, y is an integer from about 8 to about 30. More preferably, y is an integer from about 10 to about 20.

The particular alkylphenyl group in the very long chain alkylphenyl polyoxyalkylene amine employed of the present invention is critical for the prevention and control of engine deposits, particularly intake valve deposits. In particular, it has been found that employing an alkylphenyl group wherein the alkyl group contains at least 40 carbon atoms results in an alkylphenyl polyoxyalkylene amine which has improved engine deposit control.

DEFINITIONS

As used herein the following terms have the following meanings unless expressly stated to the contrary.

The term "hydrocarbyl" refers to an organic radical primarily composed of carbon and hydrogen which may be aliphatic, alicyclic, aromatic or combinations thereof, e.g., aralkyl or alkaryl. Such hydrocarbyl groups are generally free of aliphatic unsaturation, i.e., olefinic or acetylenic unsaturation, but may contain minor amounts of heteroatoms, such as oxygen or nitrogen, or halogens, such as chlorine.

The term "alkyl" refers to both straight- and branched-chain alkyl groups.

The term "lower alkyl" refers to alkyl groups having 1 to about 6 carbon atoms and includes primary, secondary, and tertiary alkyl groups. Typical lower alkyl groups include, for example, methyl, ethyl, n-propyl, isopropyl, n-butyl, sec-butyl, t-butyl, n-pentyl, n-hexyl, and the like.

The term "alkylene" refers to straight- and branched-chain alkylene groups having at least 2 carbon atoms. Typical alkylene groups include, for example, ethylene (—CH$_2$CH$_2$—), propylene (—CH$_2$CH$_2$CH$_2$—), isopropylene (—CH(CH$_3$)CH$_2$—), n-butylene (—CH$_2$CH$_2$CH$_2$CH$_2$—), sec-butylene (—CH(CH$_2$CH$_3$)CH$_2$—), n-pentylene (—CH$_2$CH$_2$CH$_2$CH$_2$CH$_2$—), and the like.

The term "polyoxyalkylene" refers to a polymer or oligomer having the general formula:

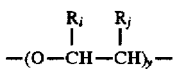

wherein $R_i$ and $R_j$ are each independently hydrogen or lower alkyl groups, and y is an integer from about 5 to about 50. When referring herein to the number of oxyalkylene units in a particular polyoxyalkylene compound, it is to be understood that this number refers to the average number of oxyalkylene units in such compounds unless expressly stated to the contrary.

GENERAL SYNTHETIC PROCEDURES

The very long chain alkylphenyl polyoxyalkylene amines of this invention may be prepared by the following general methods and procedures. It should be appreciated that where typical or preferred process conditions (e.g., reaction temperatures, times, mole ratios of reactants, solvents, pressures, etc.) are given, other process conditions may also be used unless otherwise stated. Optimum reaction conditions may vary with the particular reactants or solvents used, but such conditions can be determined by one skilled in the art by routine optimization procedures.

The alkylphenyl polyoxyalkylene amines of the present invention contain (a) a very long chain alkylphenyl component, (b) a polyoxyalkylene component, and (c) an amine component.

A. The Preferred Alkylphenyl Component

The specific alkylphenyl group employed in the very long chain alkylphenyl polyoxyalkylene amine of the instant invention is critical for the prevention and control of engine deposits, particularly intake valve deposits. In particular, it has been found that employing an alkylphenyl group wherein the alkyl group contains at least 40 carbon atoms results in a very long chain alkylphenyl polyoxyalkylene amine which has improved engine deposit control.

The preferred alkylphenyl group of the very long chain alkylphenyl polyoxyalkylene amine employed in this invention is derived from the corresponding alkylphenol of Formula II below:

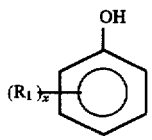
(II)

wherein $R_1$ is an alkyl group of at least 40 carbon atoms. Preferably, $R_1$ is an alkyl group of from about 50 to about 200 carbon atoms. More preferably, $R_1$ is an alkyl group of from about 50 to about 100 carbon atoms. Most preferably, $R_1$ is an alkyl group of about 60 to about 100 carbon atoms.

X is an integer from about 1 to about 2. When x is one, the alkylphenyl is a monoalkylphenyl; whereas when x is two, the alkylphenyl is a dialkylphenyl. Preferably, x is one.

The alkylphenols of Formula II above are prepared by reacting the appropriate olefin or olefin mixture with phenol in the presence of an alkylating catalyst at a temperature of from about 60° C. to about 200° C., and preferably from about 125° C. to about 180° C. either neat or in an essentially inert solvent at atomspheric pressure. Preferred alkylating catalysts are a sulfonic acid catalyst such as Amberlyst 15® available from Rohm and Haas, Philadelphia, Pa., or boron trifluoride (or an etherate of boron trifluoride). Molar ratios of reactants can be employed. When molar ratios are employed, the reaction yields a mixture of monoalkylphenol, dialkylphenol, and unreacted phenol. As noted above, monoalkylphenol and dialkylphenol can be used to prepare the additives used in the compositions of this invention whereas the unreacted phenol is preferably removed from the post reaction mixture via conventional techniques. Alternatively, molar excess of phenol can be employed, i.e., from about 2 to about 2.5 equivalents of phenol for each equivalent of olefin with unreacted phenol recycled. The latter process maximizes monoalkylphenol. Examples of inert solvents include benzene, toluene, chlorobenzene, and 250 thinner which is a mixture of aromatics, paraffins, and naphthenes.

Particularly preferred alkylphenols employed in this invention are monoalkylphenols represented by Formula III below:

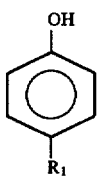
(III)

wherein $R_1$ is as defined above.

A particularly preferred class of olefins for use in preparing alkylphenols useful in this invention are polyolefin polymers. Polyolefin polymers are polymers comprising a major amount of $C_2$ to $C_5$ mono-olefins, e.g., ethylene, propylene, butylene, isobutylene, and pentylene. The polymers can be homopolymers such as polyisobutylene as well as copolymers of two or more such olefins such as copolymers of: ethylene and propylene, butylene, and isobutylene, etc. Other copolymers include those in which a minor amount of the copolymer monomers, e.g., from about 1 to about 20 mole percent is a $C_4$ to $C_8$ nonconjugated diolefin, e.g., a copolymer of isobutylene and butadiene or a copolymer of ethylene, propylene, and 1,4-hexadiene, etc.

The polyolefin polymer usually contains at least 40 carbon atoms, although preferably from about 50 to about 200 carbon atoms and more preferably from about 50 to about 100 carbon atoms. Most preferably, the polyolefin polymer will contain about 60 to about 100 carbon atoms.

A particularly preferred class of olefin polymers comprises the polybutenes, which are prepared by polymerization of one or more of 1-butene, 2-butene, and isobutene. Especially desirable are polybutenes containing a substantial proportion of units derived from isobutene. The polybutene may contain minor amounts of butadiene which may or may not be incorporated in the polymer. Most often the isobutene units constitute about 80%, preferably at least about 90%, of the units in the polymer. These polybutenes are readily available commercial materials well known to those skilled in the art. Disclosures thereof will be found, for example, in U.S. Pat. Nos. 3,215,707; 3,231,587; 3,515,669; and 3,579,450, as well as U.S. Pat. No. 3,912,764. The above are incorporated by reference for their disclosures of suitable polybutenes.

One type of suitable polyolefins are those containing an alkylvinylidene isomer present in an amount at least about 20%, and preferably at least about 50%, of the total polyolefin composition. The preferred alkylvinylidene isomers include methylvinylidene and ethylvinylidene, more preferably the methylvinylidene isomer.

Accordingly, high molecular weight polyolefins which may be used in this invention include polyisobutenes which comprise at least about 20% of the more reactive methylvinylidene isomer, preferably at least 50%, and more preferably at least 70%. Suitable polyisobutenes include those prepared using $BF_3$ catalysts. The preparation of such polyisobutenes in which the methylvinylidene isomer comprises a high percentage of the total composition is described in U.S. Pat. Nos. 4,152,499 and 4,605,808, the disclosures of which are incorporated herein by reference.

Examples of suitable polyisobutenes having a high methylvinylidene content include Ultravis 10, a polyisobutene having a molecular weight of about 950 and a methylvinylidene content of about 76%, and Ultravis 30, a polyisobutene having a molecular weight of about 1,300 and a methylvinylidene content of about 74%, both available from British Petroleum.

B. The Preferred Polyoxyalkylene Component

The alkylphenyl polyoxyalkylene polymers which are utilized in preparing the very long chain alkylphenyl polyoxyalkylene amines of the present invention are monohydroxy compounds, i.e., alcohols, often termed alkylphenyl "capped" polyoxylalkylene glycols and are to be distinguished from the polyoxyalkylene glycols (diols), which are not alkylphenyl terminated, i.e., not capped. The alkylphenyl polyoxyalkylene alcohols are produced by the addition of lower alkylene oxides, such as ethylene oxide, propylene oxide, or the butylene oxides, to the alkylphenol of Formula II, i.e.,

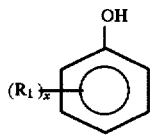
(II)

under polymerization conditions, wherein $R_1$ and x are as defined above. Preferred polyoxyalkylene polymers are those derived from $C_3$ to $C_4$ oxyalkylene units; more preferably $C_3$ oxyalkylene units. Methods of production and properties of these polymers are disclosed in U.S. Pat. Nos. 2,841,479 and 2,782,240 and Kirk-Othmer's "*Encyclopedia of Chemical Technology*", Volume 19, page 507. In the polymerization reaction, a single type of alkylene oxide may be employed, e.g., propylene oxide, in which case the product is a homopolymer, e.g., a polyoxypropylene alcohol. However, copolymers are equally satisfactory and random copolymers are readily prepared by contacting the hydroxy-containing compound with a mixture of alkylene oxides, such as a mixture of propylene and butylene oxides. Block copolymers of oxyalkylene units also provide satisfactory polyoxyalkylene units for the practice of the present invention.

The amount of alkylene oxide employed in this reaction will generally depend on the number of oxyalkylene units desired in the product. Typically, the molar ratio of alkylene oxide to hydroxy-containing compound will range from about 5:1 to about 100:1; preferably, from about 8:1 to about 50:1, more preferably from about 10:1 to about 30:1.

Alkylene oxides suitable for use in this polymerization reaction include, for example, ethylene oxide; propylene oxide; and butylene oxides, such as 1,2-butylene oxide (1,2-epoxybutane) and 2,3-butylene oxide (2,3-epoxybutane). Preferred alkylene oxides are ethylene oxide, propylene oxide and 1,2-butylene oxide.

C. The Preferred Amine Component

As indicated above, the very long chain alkylphenyl polyoxyalkylene amines of the present invention contain an amine component.

In general, the amine component will contain an average of at least about one basic nitrogen atom per molecule. A "basic nitrogen atom" is one that is titratable by a strong acid, for example, a primary, secondary, or tertiary amine nitrogen; as distinguished from, for example, an carbamyl nitrogen, e.g., —OC(O)NH—, which is not titratable with a strong acid. Preferably, at least one of the basic nitrogen atoms of the amine component will be primary or secondary amine nitrogen, more preferably at least one will be a primary amine nitrogen.

The amine component of the very long chain alkylphenyl polyoxyalkylene amines of this invention is preferably derived from ammonia, a primary alkyl or secondary dialkyl monoamine, or a polyamine having a terminal amino nitrogen atom.

Primary alkyl monoamines useful in preparing compounds of the present invention contain 1 nitrogen atom and from about 1 to about 20 carbon atoms, more preferably about 1 to 6 carbon atoms, most preferably 1 to 4 carbon atoms. Examples of suitable monoamines include N-methylamine, N-ethylamine, N-n-propylamine, N-isopropylamine, N-n-butylamine, N-isobutylamine, N-sec-butylamine, N-tert-butylamine, N-n-pentylamine, N-cyclopentylamine, N-n-hexylamine, N-cyclohexylamine, N-octylamine, N-decylamine, N-dodecylamine, N-octadecylamine, N-benzylamine, N-(2-phenylethyl) amine, 2-aminoethanol, 3-amino-1-propanol, 2-(2-aminoethoxy)ethanol, N-(2-methoxyethyl)amine, N-(2-ethoxyethyl)amine and the like. Preferred primary amines are N-methylamine, N-ethylamine and N-n-propylamine.

The amine component of the presently employed fuel additive may also be derived from a secondary dialkyl monoamine. The alkyl groups of the secondary amine may be the same or different and will generally each contain about 1 to about 20 carbon atoms, more preferably about 1 to about 6 carbon atoms, most preferably about 1 to aobut 4 carbon atoms. One or both of the alkyl groups may also contain one or more oxygen atoms.

Preferably, the alkyl groups of the secondary amine are independently selected from the group consisting of methyl, ethyl, propyl, butyl, pentyl, hexyl, 2-hydroxyethyl and 2-methoxyethyl. More preferably, the alkyl groups are methyl, ethyl or propyl.

Typical secondary amines which may be used in this invention include N,N-dimethylamine, N,N-diethylamine, N,N-di-n-propylamine, N,N-diisopropylamine, N,N-di-n-butylamine, N,N-di-sec-butylamine, N,N-di-n-pentylamine, N,N-di-n-hexylamine, N,N-dicyclohexylamine, N,N-dioctylamine, N-ethyl-N-methylamine, N-methyl-N-n-propylamine, N-n-butyl-N-methylamine, N-methyl-N-octylamine, N-ethyl-N-isopropylamine, N-ethyl-N-octylamine, N,N-di(2-hydroxyethyl)amine, N,N-di(3-hydroxypropyl)amine, N,N-di(ethoxyethyl)amine, N,N-di (propoxyethyl)amine and the like. Preferred secondary amines are N,N-dimethylamine, N,N-diethylamine and N,N-di-n-propylamine.

Cyclic secondary amines may also be employed to form the additives of this invention. In such cyclic compounds, the alkyl groups, when taken together, form one or more 5- or 6-membered rings containing up to about 20 carbon atoms. The ring containing the amine nitrogen atom is generally saturated, but may be fused to one or more saturated or unsaturated rings. The rings may be substituted with hydrocarbyl groups of from 1 to about 10 carbon atoms and may contain one or more oxygen atoms.

Suitable cyclic secondary amines include piperidine, 4-methylpiperidine, pyrrolidine, morpholine, 2,6-dimethylmorpholine and the like.

Suitable polyamines can have a straight- or branched-chain structure and may be cyclic or acyclic or combinations thereof. Generally, the amine nitrogen atoms of such polyamines will be separated from one another by at least two carbon atoms, i.e., polyamines having an aminal structure are not suitable. The polyamine may also contain one or more oxygen atoms, typically present as an ether or a hydroxyl group. Polyamines having a carbon-to-nitrogen ratio of from about 1:1 to about 10:1 are particularly preferred.

In preparing the compounds of this invention using a polyamine where the various nitrogen atoms of the polyamine are not geometrically equivalent, several substitutional isomers are possible and each of these possible isomers is encompassed within this invention.

A particularly preferred group of polyamines for use in the present invention are polyalkylene polyamines, including alkylene diamines. Such polyalkylene polyamines will typically contain from about 2 to about 12 nitrogen atoms and from about 2 to about 40 carbon atoms, preferably about 2 to 24 carbon atoms. Preferably, the alkylene groups of such polyalkylene polyamines will contain from about 2 to about 6 carbon atoms, more preferably from about 2 to about 4 carbon atoms.

Examples of suitable polyalkylene polyamines include ethylenediamine, propylenediamine, isopropylenediamine, butylenediamine, pentylenediamine, hexylenediamine, diethylenetriamine, dipropylenetriamine, dimethylaminopropylamine, diisopropylenetriamine, dibutylenetriamine, di-sec-butylenetriamine, triethylenetetraamine, tripropylenetetraamine, triisobutylenetetraamine, tetraethylenepentamine, pentaethylenehexamine, dimethylaminopropylamine, and mixtures thereof.

Particularly suitable polyalkylene polyamines are those having the formula:

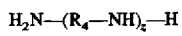

wherein $R_4$ is a straight- or branched-chain alkylene group having from about 2 to about 6 carbon atoms, preferably from about 2 to about 4 carbon atoms, most preferably about 2 carbon atoms, i.e., ethylene (—$CH_2CH_2$—); and z is an integer from about 1 to about 4, preferably about 1 or about 2.

Particularly preferred polyalkylene polyamines are ethylenediamine, diethylenetriamine, triethylenetetraamine, and tetraethylenepentamine. Most preferred are ethylenediamine and diethylenetriamine, especially ethylenediamine.

Also contemplated for use in the present invention are cyclic polyamines having one or more 5- to 6-membered rings. Such cyclic polyamines compounds include piperazine, 2-methylpiperazine, N-(2-aminoethyl) piperazine, N-(2-hydroxyethyl)piperazine, 1,2-bis-(N-piperazinyl)ethane, 3-aminopyrrolidine, N-(2-aminoethyl) pyrrolidine, and the like. Among the cyclic polyamines, the piperazines are preferred.

Many of the polyamines suitable for use in the present invention are commercially available and others may be prepared by methods which are well known in the art. For example, methods for preparing amines and their reactions are detailed in Sidgewick's "The Organic Chemistry of Nitrogen", Clarendon Press, Oxford, 1966; Noller's "Chemistry of Organic Compounds", Saunders, Philadelphia, 2nd Ed., 1957; and Kirk-Othmer's "Encyclopedia of Chemical Technology", 2nd Ed., especially Volume 2, pp. 99–116.

D. Preparation of the Alkylphenyl Polyoxyalkylene Amine

The additives employed in this invention can be most conveniently prepared by reacting a very long chain alkylphenyl polyoxyalkylene alcohol with a nitrogen-containing compound such as ammonia, a primary or secondary alkyl monoamine or a polyamine as described above.

As noted above, the polyoxyalkylene alcohols of the alkylphenyl polyoxyalkylene amines of the present invention are known compounds that can be prepared using conventional procedures. As mentioned, suitable procedures for preparing such compounds are taught in U.S. Pat. Nos. 2,782,240 and 2,841,479, as well as U.S. Pat. No. 4,881,945, the disclosures of which are incorporated herein by reference.

Preferably, the polyoxyalkylene alcohols are prepared by contacting a phenoxide metal salt having the formula:

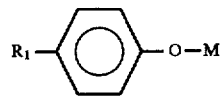

(V)

wherein $R_1$ is an alkyl substitutent in the para position having at least 40 carbon atoms and M is a metal cation, such as lithium, sodium, potassium, and the like, with from about 1 to about 100 molar equivalents of an alkylene oxide (an epoxide) having the formula:

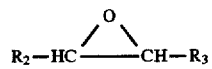

wherein $R_2$ and $R_3$ are as defined above.

Typically, metal salt V is prepared by contacting the corresponding hydroxy compound,

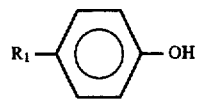

(VI)

with a strong base, such as sodium hydride, potassium hydride, sodium amide, and the like, in an inert solvent, such as toluene, xylene, and the like, under substantially anhydrous conditions at a temperature in the range from about −10° C. to about 120° C. for from about 0.25 to about 3 hours.

Metal salt V is generally not isolated, but is reacted in situ with alkylene oxide VI to provide, after neutralization, the polyoxyalkylene alcohol. This polymerization reaction is typically conducted in a substantially anhydrous inert solvent at a temperature of from about 30° C. to about 150° C. for from about 2 to about 120 hours. Suitable solvents for this reaction, include toluene, xylene, and the like. Typically, the reaction is conducted at a pressure sufficient to contain the reactants and the solvent, preferably at atmospheric or ambient pressure.

The alkylphenyl polyoxyalkylene alcohol may be converted to the desired alkyphenyl polyoxyalkylene amine by a variety of procedures known in the art.

For example, the terminal hydroxy group on the alkylphenyl polyoxyalkylene alcohol may first be converted to a suitable leaving group, such as a mesylate, chloride or bromide, and the like, by reaction with a suitable reagent, such as methanesulfonyl chloride. The resulting alkylphenyl polyoxyalkylene mesylate or equivalent intermediate may then be converted to a phthalimide derivative by reaction with potassium phthalimide in the presence of a suitable solvent, such as N,N-dimethylformamide. The alkylphenyl polyoxyalkylene phthalimide derivative is subsequently converted to the desired alkylphenyl polyoxyalkylene amine by reaction with a suitable amine, such as hydrazine.

The polyoxyalkylene alcohol may also be converted to the corresponding polyoxyalkylene chloride by reaction with a suitable halogenating agent, such as HCl, thionyl chloride, or epichlorohydrin, followed by displacement of the chloride with a suitable amine, such as ammonia, a primary or secondary alkyl monoamine, or a polyamine, as described, for example, in U.S. Pat. No. 4,247,301 to Honnen, the disclosure of which is incorporated herein by reference.

Alternatively, the very long chain alkylphenyl polyoxyalkylene amines of the present invention may be prepared from the corresponding alkylphenyl polyoxyalkylene alcohol by a process commonly referred to as reductive amination, such as described in U.S. Pat. No. 5,112,364 to Rath et al. and U.S. Pat. No. 4,332,595 to Herbstman et al., the disclosures of which are incorporated herein by reference.

In the reductive amination procedure, the alkylphenyl polyoxyalkylene alcohol is aminated with an appropriate amine, such as ammonia or a primary alkyl monoamine, in the presence of hydrogen and a hydrogenation-dehydrogenation catalyst. The amination reaction is typically carried out at temperatures in the range of about 160° C. to about 250° C. and pressures of about 1,000 to about 5,000 psig, preferably about 1,500 to about 3,000 psig. Suitable hydrogenation-dehydrogenation catalysts include those containing platinum, palladium, cobalt, nickel, copper, or chromium, or mixtures thereof. Generally, an excess of the ammonia or amine reactant is used, such as about a 5-fold to about 60-fold molar excess, and preferably about a 10-fold to about 40-fold molar excess, of ammonia or amine.

When the reductive amination is carried out with a polyamine reactant, the amination is preferably conducted using a two-step procedure as described in commonly-assigned copending U.S. patent application Ser. No. 08/574,485, filed Dec. 19, 1995 (Attorney Docket No. T-5252), and titled, "Reductive Amination Process for Manufacturing a Fuel Additive From Polyoxybutylene Alcohol with Ethylene Diamine", the disclosure of which is incorporated herein by reference in its entirety. According to this procedure, a polyoxyalkylene alcohol is first contacted with a hydrogenation-dehydrogenation catalyst at a temperature of at least 230° C. to provide a polymeric carbonyl intermediate, which is subsequently reacted with a polyamine at a temperature below about 190° C. in the presence of hydrogen and a hydrogenation catalyst to produce the polyalkylene polyamine adduct.

The very long chain alkylphenyl polyoxyalkylene amines obtained by amination can be added as such to hydrocarbon fuels.

FUEL COMPOSITIONS

The very long chain alkylphenyl polyoxyalkylene amines of the present invention are useful as additives in hydrocarbon fuels to prevent and control engine deposits, particularly intake valve deposits. Typically, the desired deposit control will be achieved by operating an internal combustion engine with a fuel composition containing a very long chain alkylphenyl polyoxyalkylene amine of the present invention. The proper concentration of additive necessary to achieve the desired deposit control varies depending upon the type of fuel employed, the type of engine, and the presence of other fuel additives.

In general, the concentration of the very long chain alkylphenyl polyoxyalkylene amines of this invention in hydrocarbon fuel will range from about 50 to about 2,500 parts per million (ppm) by weight, preferably from about 75 to about 1,000 ppm. When other deposit control additives are present, a lesser amount of the present additive may be used. Furthermore, lower concentrations of, for example, from about 30 to about 70 ppm may be preferred when the present additives are employed as carburetor detergents only.

The very long chain alkylphenyl polyoxyalkylene amines of the present invention may be formulated as a concentrate using an inert stable oleophilic (i.e., dissolved in gasoline) organic solvent boiling in the range of from about 150° F. to about 400° F. (from about 65° C. to about 205° C.). Preferably, an aliphatic or an aromatic hydrocarbon solvent is used, such as benzene, toluene, xylene, or higher-boiling aromatics or aromatic thinners. Aliphatic alcohols containing from about 3 to about 8 carbon atoms, such as isopropanol, isobutylcarbinol, n-butanol, and the like, in combination with hydrocarbon solvents are also suitable for use with the present additives. In the concentrate, the amount of the additive will generally range from about 10 to about 70 weight percent, preferably from about 10 to about 50 weight percent, more preferably from about 10 to about 25 weight percent.

In gasoline fuels, other fuel additives may be employed with the additives of the present invention, including, for example, oxygenates, such as t-butyl methyl ether, antiknock agents, such as methylcyclopentadienyl manganese tricarbonyl, and other dispersants/detergents, such as hydrocarbyl amines, hydrocarbyl poly(oxyalkylene) amines, or succinimides. Additionally, antioxidants, metal deactivators, and demulsifiers may be present.

In diesel fuels, other well-known additives can be employed, such as pour point depressants, flow improvers, cetane improvers, and the like.

A fuel-soluble, nonvolatile carrier fluid or oil may also be used with the very long chain alkylphenyl polyoxyalkylene amines of this invention. The carrier fluid is a chemically inert hydrocarbon-soluble liquid vehicle which substantially increases the nonvolatile residue (NVR) or solvent-free liquid fraction of the fuel additive composition while not overwhelmingly contributing to octane requirement increase. The carrier fluid may be a natural or synthetic oil, such as mineral oil, refined petroleum oils, synthetic polyalkanes and alkenes, including hydrogenated and unhydrogenated polyalphaolefins, and synthetic polyoxyalkylene-derived oils, such as those described, for example, in U.S. Pat. No. 4,191,537 to Lewis and polyesters, such as those described, for example, in U.S. Pat. Nos. 3,756,793 and 5,004,478, and in European Patent Application Nos. 356,726 and 382,159.

These carrier fluids are believed to act as a carrier for the fuel additives of the present invention and to assist in removing and retarding deposits. The carrier fluid may also exhibit synergistic deposit control properties when used in combination with the very long chain alkylphenyl polyoxyalkylene amines of this invention.

The carrier fluids are typically employed in amounts ranging from about 100 to about 5,000 ppm by weight of the hydrocarbon fuel, preferably from about 400 to about 3,000 ppm of the fuel. Preferably, the ratio of carrier fluid to deposit control additive will range from about 0.5:1 to about 10:1, more preferably from about 2:1 to about 5:1, most preferably from about 4:1.

When employed in a fuel concentrate, carrier fluids will generally be present in amounts ranging from about 20 to about 60 weight percent, preferably from about 30 to about 50 weight percent.

EXAMPLES

The following examples are presented to illustrate specific embodiments of the present invention and synthetic preparations thereof and should not be interpreted as is limitations upon the scope of the invention.

Example 1

Preparation of Polyisobutylphenyl Poly (oxypropylene) Alcohol

In a manner similar to that described in U.S. Pat. No. 4,881,945 to Buckley, a polyisobutyl phenol prepared by alkylating phenol with NAPVIS® 5 polyisobutene having an average molecular weight of about 750 (available commercially from British Petroleum) was reacted with propylene oxide to form a polyisobutylphenyl poly(oxypropylene) alcohol having an average of about 14 oxypropylene units.

Example 2

Preparation of α-(Methanesulfonyl)-ω-4-polyisobutylphenoxypoly(oxypropylene)

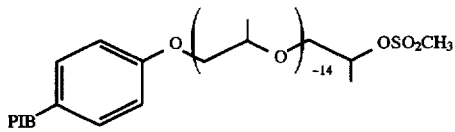

To a flask equipped with a magnetic stirrer, septa and a nitrogen inlet was added 32.6 grams of the product from Example 1, 100 mL of dichloromethane and 3.3 mL of triethylamine. The flask was cooled in an ice bath and 1.7 mL of methanesulfonyl chloride were added dropwise. The ice bath was removed and the reaction was stirred at room temperature for 16 hours. Dichloromethane (300 mL) was added and the organic phase was washed two times with saturated aqueous sodium bicarbonate, and then once with brine. The organic layer was dried over anhydrous sodium sulfate, filtered and concentrated in vacuo to yield 35.0 grams of the desired product.

Example 3

Preparation of α-(2-Phthalimidobutyl)-ω-4-polyisobutylphenoxypoly(oxypropylene)

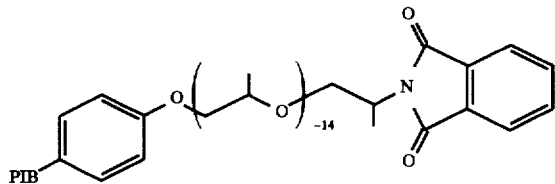

To a flask equipped with a magnetic stirrer, reflux condenser, thermometer and nitrogen inlet was added potassium phthalimide (18.5 grams), N,N-dimethylformamide (200 mL) and the mesylate prepared in Example 2 (35.0 grams). The mixture was heated to reflux for sixteen hours, cooled to room temperature and diluted with 1 liter of diethyl ether. The organic phase was washed three times with water, once with brine, dried over anhydrous magnesium sulfate, filtered and concentrated in vacuo to yield 34.5 grams as a brown oil.

Example 4

Preparation of α-(2-Aminobutyl)-ω-4-polyisobutylphenoxypoly(oxypropylene)

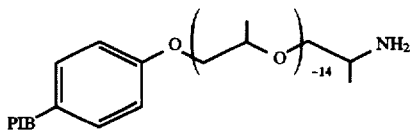

To a flask equipped with a magnetic stirrer, reflux condensor and nitrogen inlet was added anhydrous hydrazine (0.8 mL), ethanol (100 mL) and the product from Example 3 (34.5 grams). The mixture was refluxed for sixteen hours, cooled to room temperature, filtered and concentrated in vacuo. The residue was diluted with 400 mL of diethyl ether, washed twice with saturated aqueous sodium bicarbonate, once with water, once with brine, dried over anhydrous magnesium sulfate, filtered and concentrated in vacuo to yield an oil. The oil was chromatographed on silica gel, eluting with hexane/diethyl ether (1:1) followed by hexane/diethyl ether/methanol/isopropylamine (40:40:15:5) to afford 11.0 grams of the desired product as a yellow oil. The product had an average of 14 oxypropylene units. $^1$H NMR (CDCl$_3$, D$_2$O) d 7.0–7.25 (m, 2H), 6.65–6.8 (m, 2H), 2.8–4.0 (m, 45H), 0.4–1.8 (m, 142H).

Example 5

Single-Cylinder Engine Test

The test compounds were blended in gasoline and their deposit reducing capacity determined in an ASTM/CFR single-cylinder engine test. A Waukesha CFR single-cylinder engine was used. Each run was carried out for 15 hours, at the end of which time the intake valve was removed, washed with hexane, and weighed. The previously determined weight of the clean valve was subtracted from the weight of the value at the end of the run. The differences between the two weights is the weight of the deposit. A lesser amount of deposit indicates a superior additive. The operating conditions of the test were as follows: water jacket temperature 200° F.; vacuum of 12 in Hg, air-fuel ratio of 12, ignition spark timing of 400 BTC; engine speed is 1.800 rpm; the crankcase oil is a commercial 30W oil.

The amount of carbonaceous deposit in milligrams on the intake valves is reported for each of the test compounds in Table I.

TABLE I

Single-Cylinder Engine Test Results

| Sample[1] | Intake Valve Deposit Weight (in milligrams) | | |
|---|---|---|---|
| | Run 1 | Run 2 | Average |
| Base Fuel | 300.1 | 302.3 | 301.2 |
| Example 4 | 16.7 | 21.2 | 19.0 |

[1]At 150 parts per million actives (ppma).

The base fuel employed in the above single-cylinder engine tests was a regular octane unleaded gasoline containing no fuel detergent. The test compounds were admixed with the base fuel to give a concentration of 150 ppma (parts per million actives).

The data in Table I illustrates the significant reduction in intake valve deposits provided by a very long chain alkylphenyl polyoxyalkylene amine of the present invention compared to the base fuel.

What is claimed is:

1. A fuel-soluble compound of the formula:

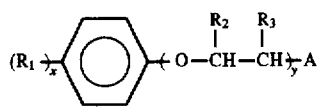

wherein $R_1$ is an alkyl group having at least 40 carbon atoms;

$R_2$ and $R_3$ are each independently hydrogen or lower alkyl having from about 1 to about 2 carbon atoms and each $R_2$ and $R_3$ is independently selected in each —O—$CHR_2$—$CHR_3$— unit;

A is an amine moiety derived from ammonia, a primary alkyl monoamine having about 1 to 20 carbon atoms, a secondary dialkyl monoamine having about 1 to 20 carbon atoms in each alkyl group, or a polyamine having about 2 to about 12 amine nitrogen atoms and about 2 to about 40 carbon atoms;

x is an integer from about 1 to about 2; and y is an integer from about 5 to about 50.

2. The compound according to claim 1, wherein $R_1$ is an alkyl group having from about 50 to about 200 carbon atoms.

3. The compound according to claim 2, wherein $R_1$ is an alkyl group having from about 50 to about 100 carbon atoms.

4. The compound according to claim 1, wherein one of $R_2$ and $R_3$ is methyl or ethyl, and the other is hydrogen.

5. The compound according to claim 1, wherein x is about 1.

6. The compound according to claim 1, wherein y is an integer of from about 8 to about 30.

7. The compound according to claim 6, wherein y is an integer of from about 10 to about 20.

8. The compound according to claim 1, wherein A is derived from ammonia or a polyamine.

9. The compound according to claim 1, wherein A is derived from ammonia or a primary alkyl monoamine that contains about 1 nitrogen atom and from about 1 to about 4 carbon atoms.

10. The compound according to claim 9, wherein A is derived from ammonia.

11. The compound according to claim 8, wherein A is derived from a polyamine having from about 2 to about 12 amine nitrogen atoms and from about 2 to about 40 carbon atoms.

12. The compound according to claim 11, wherein A is a polyamine moiety derived from a polyalkylene polyamine containing from about 2 to about 12 amine nitrogen atoms and from about 2 to about 24 carbon atoms.

13. The compound according to claim 12, wherein the polyalkylene polyamine has the formula:

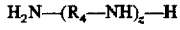

wherein $R_4$ is an alkylene group having from about 2 to about 6 carbon atoms and z is an integer from about 1 to about 4.

14. The compound according to claim 13, wherein $R_4$ is an alkylene group having from about 2 to about 4 carbon atoms.

15. The compound according to claim 13, wherein the polyalkylene polyamine is ethylene diamine or diethylene triamine.

16. The compound according to claim 15, wherein the polyalkylene polyamine is ethylene diamine.

17. A fuel composition comprising a major amount of hydrocarbons boiling in the gasoline or diesel fuel range and an effective deposit-controlling amount of a fuel-soluble compound of the formula:

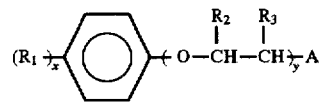

wherein $R_1$ is an alkyl group having at least 40 carbon atoms;

$R_2$ and $R_3$ are each independently hydrogen or lower alkyl having from about 1 to about 2 carbon atoms and each $R_2$ and $R_3$ is independently selected in each —O—$CHR_2$—$CHR_3$— unit;

A is an amine moiety derived from ammonia, a primary alkyl monoamine having about 1 to 20 carbon atoms, a secondary dialkyl monoamine having about 1 to 20 carbon atoms in each alkyl group, or a polyamine having about 2 to about 12 amine nitrogen atoms and about 2 to about 40 carbon atoms;

x is an integer from about 1 to about 2; and y is an integer from about 5 to about 50.

18. The fuel composition according to claim 17, wherein $R_1$ is an alkyl group having from about 50 to about 200 carbon atoms.

19. The fuel composition according to claim 18, wherein $R_1$ is an alkyl group having from about 50 to about 100 carbon atoms.

20. The fuel composition according to claim 17, wherein one of $R_2$ and $R_3$ is methyl or ethyl, and the other is hydrogen.

21. The fuel composition according to claim 17, wherein x is about 1.

22. The fuel composition according to claim 17, wherein y is an integer of from about 8 to about 30.

23. The fuel composition according to claim 22, wherein y is an integer of from about 10 to about 20.

24. The fuel composition according to claim 17, wherein A is derived from ammonia or a polyamine.

25. The fuel composition according to claim 17, wherein A is derived from ammonia or a primary alkyl monoamine that contains about 1 nitrogen atom and from about 1 to about 4 carbon atoms.

26. The fuel composition according to claim 25, wherein A is derived from ammonia.

27. The fuel composition according to claim 24, wherein A is derived from a polyamine having from about 2 to about 12 amine nitrogen atoms and from about 2 to about 40 carbon atoms.

28. The fuel composition according to claim 27, wherein A is a polyamine moiety derived from a polyalkylene polyamine containing from about 2 to about 12 amine nitrogen atoms and from about 2 to about 24 carbon atoms.

29. The fuel composition according to claim 28, wherein the polyalkylene polyamine has the formula:

wherein $R_4$ is an alkylene group having from about 2 to about 6 carbon atoms and z is an integer from about 1 to about 4.

30. The fuel composition according to claim 29, wherein $R_4$ is an alkylene group having from about 2 to about 4 carbon atoms.

31. The fuel composition according to claim 29, wherein the polyalkylene polyamine is ethylene diamine or diethylene triamine.

32. The fuel composition according to claim 31, wherein the polyalkylene polyamine is ethylene diamine.

33. The fuel composition according to claim 17, wherein the composition contains from about 50 to about 2,500 parts per million by weight of the fuel-soluble compound.

34. The fuel composition according to claim 17, wherein the composition further contains from about 100 to about 5,000 parts per million by weight of a fuel-soluble, non-volatile carrier fluid.

35. A fuel concentrate comprising an inert stable oleophilic organic solvent boiling in the range of from about 150° F. to about 400° F. and from about 10 to about 70 weight percent of a fuel-soluble compound of the formula:

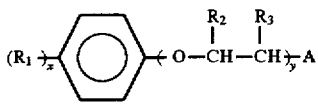

wherein $R_1$ is an alkyl group having at least 40 carbon atoms;

$R_2$ and $R_3$ are each independently hydrogen or lower alkyl having from about 1 to about 2 carbon atoms and each $R_2$ and $R_3$ is independently selected in each —O—$CHR_2$—$CHR_3$— unit;

A is an amine moiety derived from ammonia, a primary alkyl monoamine having about 1 to 20 carbon atoms, a secondary dialkyl monoamine having about 1 to 20 carbon atoms in each alkyl group, or a polyamine having about 2 to about 12 amine nitrogen atoms and about 2 to about 40 carbon atoms;

x is an integer from about 1 to about 2; and y is an integer from about 5 to about 50.

36. The fuel concentrate according to claim 35, wherein $R_1$ is a alkyl group having from about 50 to about 200 carbon atoms.

37. The fuel concentrate according to claim 36, wherein $R_1$ is an alkyl group having from about 50 to about 100 carbon atoms.

38. The fuel concentrate according to claim 35, wherein one of $R_2$ and $R_3$ is methyl or ethyl, and the other is hydrogen.

39. The fuel concentrate according to claim 35, wherein x is about 1.

40. The fuel concentrate according to claim 35, wherein y is an integer of from about 8 to about 30.

41. The fuel concentrate according to claim 40, wherein y is an integer of from about 10 to about 20.

42. The fuel concentrate according to claim 35, wherein A is derived from ammonia or a polyamine.

43. The fuel concentrate according to claim 35, wherein A is derived from ammonia or a primary alkyl monoamine that contains about 1 nitrogen atom and from about 1 to about 4 carbon atoms.

44. The fuel concentrate according to claim 43, wherein A is derived from ammonia.

45. The fuel concentrate according to claim 42, wherein A is derived from a polyamine having from about 2 to about 12 amine nitrogen atoms and from about 2 to about 40 carbon atoms.

46. The fuel concentrate according to claim 45, wherein A is a polyamine moiety derived from a polyalkylene polyamine containing from about 2 to about 12 amine nitrogen atoms and from about 2 to about 24 carbon atoms.

47. The fuel concentrate according to claim 46, wherein the polyalkylene polyamine has the formula:

$$H_2N-(R_4-NH)_z-H$$

wherein $R_4$ is an alkylene group having from about 2 to about 6 carbon atoms and z is an integer from about 1 to about 4.

48. The fuel concentrate according to claim 47, wherein $R_4$ is an alkylene group having from about 2 to about 4 carbon atoms.

49. The fuel concentrate according to claim 47, wherein the polyalkylene polyamine is ethylene diamine or diethylene triamine.

50. The fuel concentrate according to claim 49, wherein the polyalkylene polyamine is ethylene diamine.

51. The fuel concentrate according to claim 35, wherein the fuel concentrate further contains from about 20 to about 60 weight percent of a fuel-soluble, nonvolatile carrier fluid.

52. A fuel-soluble compound of the formula:

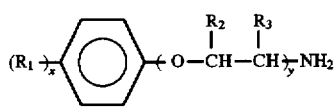

wherein $R_1$ is an alkyl group having at least 40 carbon atoms;

$R_2$ and $R_3$ are each independently hydrogen or lower alkyl having from about 1 to about 2 carbon atoms and each $R_2$ and $R_3$ is independently selected in each —O—$CHR_2$—$CHR_3$— unit;

x is an integer from about 1 to about 2; and y is an integer from about 5 to about 50.

53. A fuel composition comprising a major amount of hydrocarbons boiling in the gasoline or diesel fuel range and an effective deposit-controlling amount of a fuel-soluble compound of the formula:

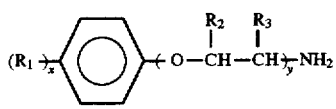

wherein $R_1$ is an alkyl group having at least 40 carbon atoms;

$R_2$ and $R_3$ are each independently hydrogen or lower alkyl having from about 1 to about 2 carbon atoms and each $R_2$ and $R_3$ is independently selected in each —O—$CHR_2$—$CHR_3$— unit;

x is an integer from about 1 to about 2; and y is an integer from about 5 to about 50.

54. A fuel concentrate comprising an inert stable oleophilic organic solvent boiling in the range of from about 150° F. to about 400° F. and from about 10 to about 70 weight percent of a fuel-soluble compound of the formula:

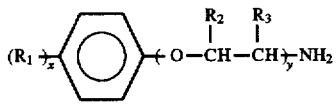

wherein $R_1$ is an alkyl group having at least 40 carbon atoms;

$R_2$ and $R_3$ are each independently hydrogen or lower alkyl having from about 1 to about 2 carbon atoms and each $R_2$ and $R_3$ is independently selected in each —O—$CHR_2$—$CHR_3$— unit;

x is an integer from about 1 to about 2; and y is an integer from about 5 to about 50.

* * * * *